Figure 1:
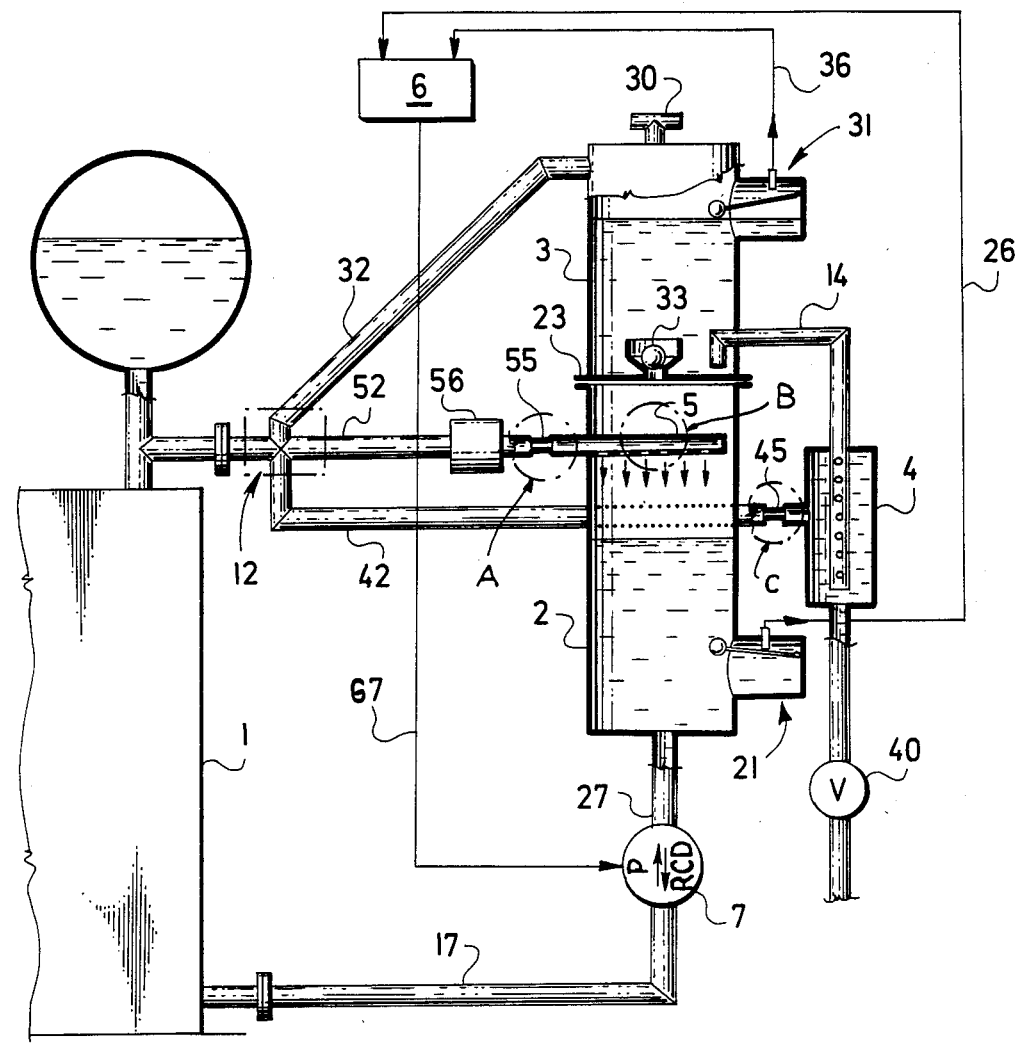

United States Patent [19]

Altmann et al.

[11] Patent Number: 4,561,866
[45] Date of Patent: Dec. 31, 1985

[54] APPARATUS FOR VACUUM CLEANING OF OIL FILLINGS

[75] Inventors: Josef Altmann, Domazlice; Jaromir Ratislav; Jaromir Ratislav, both of Pilsen, all of Czechoslovakia

[73] Assignee: Skoda, koncernova podnik, Pilsen, Czechoslovakia

[21] Appl. No.: 662,849

[22] Filed: Oct. 19, 1984

Related U.S. Application Data

[63] Continuation-in-part of Ser. No. 547,421, Oct. 31, 1983, abandoned.

[30] Foreign Application Priority Data

Nov. 3, 1982 [CS] Czechoslovakia ............. 7801-82

[51] Int. Cl.$^4$ ............................................. B01D 19/00
[52] U.S. Cl. ................................... 55/166; 55/189; 210/188
[58] Field of Search .............. 55/36, 55, 189, 467, 55/164–166; 174/14 R; 203/91; 210/188; 336/57; 417/217, 149

[56] References Cited

U.S. PATENT DOCUMENTS

| | | | |
|---|---|---|---|
| 2,340,898 | 2/1944 | Race | 174/14 R |
| 2,997,129 | 8/1961 | Bakar | 55/189 |
| 3,303,002 | 2/1967 | McAuliffe | 55/55 |
| 3,315,611 | 4/1967 | Thompson | 417/149 |
| 3,342,020 | 9/1967 | Ross | 55/164 |
| 3,358,104 | 12/1967 | Cromer et al. | 174/14 R |
| 3,591,946 | 7/1971 | Loe | 55/189 |
| 4,057,364 | 11/1977 | Bratschitsch | 417/149 X |

*Primary Examiner*—Charles Hart

[57] ABSTRACT

Contaminants of oil fillings of technological units using oil as a cooling, lubricating, insulating, or power medium, are removed by periodically applying a separating working cycle and a pressure working cycle in a vessel connected with the oil system of the technological unit, and returning the cleaned oil to the oil system of the unit. In the course of the separating working cycle, gaseous and liquid contaminants in the vessel are brought to boiling by under-pressure generated by a reversible pump; a gas-liquid cushion created thereby above the oil surface in the vessel is displaced from the vessel in the course of the following pressure working cycle, which is caused by the reverse action of the pump, while the cleaned oil is returned to the oil system of the technological unit. Both cycles are repeated as often as required to clean the oil to the desired degree.

6 Claims, 4 Drawing Figures

APPARATUS FOR VACUUM CLEANING OF OIL FILLINGS

This application is a continuation-in-part of application Ser. No. 547,421, filed Oct. 31, 1983 and now abandoned.

This invention relates to an apparatus for vacuum cleaning of oil fillings whereby undesired gaseous and liquid contaminants are removed from the oil fillings. The invention is particularly suitable for degassing and dewatering of oil fillings of technicological units, for instance, of electrical transformers with natural circulation of the cooling liquid.

Actually known method and apparatus of degassing and dewatering of technological units utilizing oil as a cooling, lubricating, insulating or power medium, can be distinguished according to the physical and chemical principles employed, by means of which the contaminations of the oil of the filling are either limited or eliminated, and also according to the type of the working process which may, according to its character, be either active or passive.

In the course of the active working process of refining, contaminating admixtures are removed from the oil filling of the technological unit by centrifugal separation, by filtration, or by vacuum cleaning, whereas in the passive process the concentration of contaminants of the oil are mostly only limited, that is, reduced. One of well-known method of the active removal of the gaseous and aqueous fraction, employed for treating the oil filling of the oil system of steam turbines, is a separation of these fractions by centrifuging the oil content. This physical principle of separation of materials due to their different densities is sometimes completed and intensified by the removal of gaseous and vapor contaminants from the space of the centrifuge under reduced pressure.

Typical passive methods of treatment of oil fillings are used in arrangements connected to the oil cooling loop of electrical transformers. Systems utilizing suitable drying agents are well known and actually most used in technical practice for the reduction of the water content oil, for instance silicagel. Similarly a freezing trap is analogically used for the reduction of the relative humidity of air above the level of the oil in the conservator. Another passive method of protection of oil fillings is their separation from the ambient air either by hermetization by means of a rubber bag or by the creation of a cushion of nitrogen gas above the oil level.

The described methods for cleaning and protection of oil in technological units have some drawbacks. The main drawbacks of active methods of removal of contaminants of oil occur with those based on centrifuging, filtration or vacuum cleaning, which are suitable for processes using a temporary cleaning cycle and the respective arrangement are also designed for this purpose. With cooling loops of electrical transformers the degassing and dehydration of oil is, for instance, performed only in the course of revision, namely, only when the transformer is cut off from operation. If some treatment of oil is required at a time beyond a planned revision, the transformer has to be cut off both from the electrical network and the oil supply mains for the time required for the performance of the centrifuging, filtration or vacuum treatment of the oil filling. As cleaning of oil is not necessarily performed at each revision, the intervals for cleaning the oil in some cases are not strictly determined, and it is impossible to guarantee the actual condition of the oil filling for the further operation of the transformer. A similar situation is, of course, also encountered in other technological arrangements, even in those cases where there is no such high demand for the cleanliness of the oil.

Passive methods of protection of oil fillings also have a number of drawbacks. Both drying and freezing traps are situated so that they reduce the relative humidity of the air in the space above the oil level of the conservator. They thus prevent contamination of oil by condensed water, but do not influence saturation of oil by gases contained in the air and by gases generated within the oil filling due to the conditions of transformer operation. The hermetization of the oil surface in the conservator does not allow any access of air or of water vapors to the oil filling, but at the same time, prevents the escape of gases generated in the oil filling in the course of operation. The dangerous condition due to saturation of oil by gases is particularly known in electrical transformers. This appears particularly in cases of quick variations of the temperature of transformers, and usually has as a result, a release of gases in the form of bubbles, causing a substantial reduction of electrical resistance of the insulating oil medium. In more advantageous cases, a shut-down of the transformer is obtained by means of a gas relay; in graver cases an electric arc is created within the machine and a breakdown may take place not only in the respective transformer, but also in the whole connected transmission system.

It is an object of this invention substantially to reduce these drawbacks. The method of vacuum cleaning of oil fillings and the respective apparatus use a vacuum separator with a built-in oil shower and a non-return valve, and furthermore an accumulating extension connected to the vacuum separator, a gravitation separator, conduits connecting this arrangement with an oil pump, and an oil distributing system.

The invention achieves by a novel method a continuous cleaning of the oil filling in the course of operation of the technological unit in order to prevent any danger of damage of the technological arrangement and, danger of a premature depreciation of the oil filling. This is achieved by supplying, in the course of a separating working cycle, a part of the oil filling with gaseous and liquid admixtures into a closed vessel, whereby this vessel an underpressure is created by taking away a part of the cleaned oil. Said underpressure is lowered to the partial pressure of gaseous components and of the saturation pressure of liquid admixtures. Due to reduction of these pressure levels, the admixtures boil, and gases and vapors escape above the oil level in the vessel and thus create a vapor-gas cushion.

In the course of a pressure working cycle, the pressure in this vessel is quickly increased above the level of atmospheric pressure by forcing therein oil with gaseous and liquid contaminants, due to which separated gases and vapors are simultaneously expelled from the vessel and the vacuum separator is refilled by oil with gaseous and liquid admixtures.

The arrangement by which this method may be carried out consists in that the oil content with gaseous and liquid admixtures is supplied from the oil system of the technological unit to a vacuum separator, and that at the end of the working pressure cycle it also enters into the space of an accumulation extension by way of a non-return valve. After achieving a maximum level in the accumulation extension, the oil content starts to be removed from the vacuum separator, by the reverse action of a reversible pump, back to the oil system of the technological unit, whereby the non-return valve is closed, and an increased underpressure is created above the established level of the oil content of the vacuum separator. Simultaneously, further oil with gaseous and liquid admixtures starts to be supplied by way of an oil shower, but only in such amount, that in the course of a further lowering of the level of oil, the pressure in the vacuum separator is continuously lowered to the partial pressures of gaseous admixtures and the level of saturation pressure of liquid admixtures and that thus a gas-vapor cushion is formed from the boiled-off admixtures. After the minimum level of the oil content is achieved, oil is again started to be supplied from the oil system of the technological unit to the vacuum separator in such an amount that an increase of pressure is obtained in the gas-vapor cushion situated above the rising oil level. After the opening of the non-return valve, first gases and vapors of the gas-vapor cushion bubble through the oil which is in the space of the accumulation extension and freely escape into the ambient atmosphere by way of the deaeration extension. The oil, by which the gas-vapor cushion has been forced out of the space of the vacuum separator, is drained from the accumulation space by a siphon into a gravitation separator, where an additional gravitational separation of oil from admixed liquids is accomplished.

An advantage of the method of vacuum cleaning of oil fillings and of the arrangement for the carrying out of such method according to the invention is primarily that the vacuum separation of gaseous and liquid admixtures of oil, followed by a compression of separated gases and vapors, is capable of reducing the concentration of contaminants of the oil filling of the technological unit at least by one order of magnitude lower than would correspond to the contaminants of oil under normal atmospheric conditions, so that undesired admixtures are continuously actively removed from the technological unit in the course of operation. Another advantage is that the arrangement according to the invention adapts itself to variations of the concentration of the contaminants in the oil filling by variation of the period of the separating cycle; in the case of an increase of the amount of contamination present in the oil filling, a shortening of the period of the separating cycle takes place, and thus also an increase of removal of gaseous and liquid contaminants. With oil cooled electrical transformers it thus secures a constant low content of water and gases in the oil, and thus also its high electrical resistance. Moreover, due to a substantial reduction of the oxygen content, it slows down the aging process of the oil and of the insulating materials, and prolongs their lifetime. The general reduction of the gas content eliminates the danger of gas bursts in case of variations of temperature, and thus prevents a shut-down of the transformer by a gas relay; under more stringent conditions it prevents a breakdown of the transformer, which in case of a gas burst is rather probable with machines operating at voltages of 100 kV and more. The arrangement according to this invention is part of the whole technological unit, and remains continuously in operation in the course of its normal operation, for instance, with a turbine, a transformer, or a hydraulic oil system and the like, and continuously maintains a high cleanliness of oil in the case of the whole time of operation. The arrangement for vacuum cleaning of oil fillings according to this invention furthermore comprises only one moving part, a reversible pump, which is sufficiently robust to be in continuous operation for the whole lifetime of the technological unit, of which it is a part, without any requirement for an increased maintenance. In case of its shut-down from operation, there is no worsening effect on the technological unit to which it is connected in comparison with operation of the apparatus without this technological unit.

Figure 2:
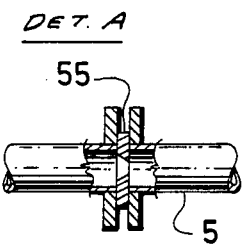
Figure 3:
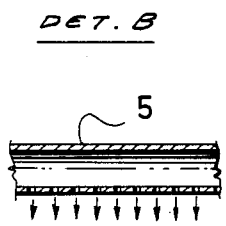
Figure 4:
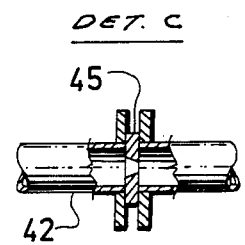

A practical exemplary embodiment of an arrangement for the practice of the method for cleaning oil fillings according to this invention is shown in the attached drawing, in which:

FIG. 1 is a view partially in section and partially in elevation of an arrangement for the cleaning of cooling oil, such arrangement being adapted to be connected to the cooling circuit of an electrical transformer with natural circulation of cooling oil, and FIGS. 2, 3, and 4 are fragmentary views in section illustrating the parts in FIG. 1 shown in the circles designated A, B, and C, respectively.

The exemplary embodiment for vacuum cleaning of oil fillings shown in the drawing comprises a vacuum separator 2, an accumulation extension 3, a gravitation separator 4, a flip-flop circuit 6, a reversible pump 7, and a set of conduits 17, 32, 42, 52 connecting this arrangement with the cooling loop 1 of an electrical transformer. The conduit 52 of an oil shower 5 branches from the cooling loop 1 of the transformer near its conservator, said conduit 52 in turn comprising a branch 12 for the connection of an overflow pipe 32 and of a gravity conduit 42. The conduit 52 of the oil shower 5 is provided with a filter 56, with a throttling orifice 55 (detail A, FIG. 2) and with an oil shower 5 which is situated within the vacuum separator 2. The gravity conduit 42 is provided with a limiting orifice plate 45 (detail C, FIG. 4) and is connected to the gravity separator 4 at the bottom of which there is situated a dewatering valve 40.

A siphon 14 leads from the gravity separator 4, terminating into the accumulation extension 3. This accumulation extension 3 is joined to the upper part of the vacuum separator 2, so that together they form a single vessel with an internal partition wall 23 provided with a non-return valve 33. The lower part of the vacuum separator 2 is provided with a lower pick-up device 21, whereas the upper part of the accumulation extension 3 is provided with an upper pick-up device 31 and with a deaeration extension 30. The overflow pipe 32 terminates into the upper part of the accumulation extension 3. The lower pick-up device 21 is connected by a lower signal wiring 26 with a flip-flop circuit 6, whereas the pick-up device 31 is connected with this flip-flop circuit 6 by the upper signal wiring 36. The output of the flip-flop circuit 6 is thereafter connected to control elements for the reversible pump 7 by a control wiring 67. The reversible pump 7 is provided both with a connecting conduit 27 connecting it with the lower part of the vacuum separator 2, and also with a feeding conduit 17, connecting it with the cooling loop 1 of the transformer.

The operation of the arrangement for vacuum cleaning of oil fillings is based on a continuous alternation of a separating and pressure working cycle, and will be described in the following as a single sequence incorporating both of these cycles.

The arrangement for vacuum cleaning of oil fillings according to this exemplary embodiment is brought to the separating working cycle at the final phase of a preceding pressure working cycle by the supply of oil from the vacuum separator 2 to the accumulation extension 3, while the oil level is increased up to the height of the switching level of the upper pick-up device 31. Thus an electrical signal is generated which is transmitted by the upper signal wiring 36 to the flip-flop circuit 6, which transmits by way of the control wiring 67 to control elements of the reversible pump its instructions for reversing its motion and thus starting the separating cycle.

This means that the reversible pump 7, which has up to now pumped oil into the internal space of the vacuum separator 2, starts to drain oil from this space by way of the connecting conduit 27 and feeding conduit 17 back into the cooling loop 1 of the transformer. Due to the return flow of oil from the space of the accumulation extension 3 to the space of the vacuum separator 2, the said non-return valve 33 is closed, and an overall pressure reduction is caused in the space of the vacuum separator 2 up to the level of the partial pressure of the gaseous admixtures, and furthermore up to the level of the saturation pressure of the liquid admixtures. The speed of lowering of the oil level in the vacuum separator is determined by the difference of volumes of oil supplies between the oil shower 5 and the discharge of the reversible pump 7, whereby the supply by means of the oil shower 5 is substantially influenced not only by static values as, for instance, by the cross-section of the throttling orifice plate 55, but also by the currently variable value of the pressure difference between the external atmospheric pressure and the pressure level of the vacuum in the gas-vapor cushion.

Due to the reduction of pressure to the above-mentioned levels, the boiling of admixtures in the whole space of the vacuum separator 2 takes place, and the gaseous and vaporous phase of the admixtures penetrates through the oil layer and collects as a gas-vapor cushion above the now lowering oil level. The process of vacuum separation is substantially intensified from the moment that the oil shower 5 immerges from the the oil, by means of which shower 5 oil with admixtures is continuously flowing into the space of the vacuum separator 2. The separating working cycle is finished when the oil level achieved a height at which the lower pick-up device 21 becomes active. Under these conditions, an electrical signal is generated by the lower pick-up device 21, which signal is transmitted by way of the signal wiring 26 to the flip-flop circuit 6, which electrical signal is transmitted by way of the control wiring 67 to control elements of the reversible pump 7 for changing the direction of its operation.

Thus the pressure working cycle is started. The oil is thereby supplied to the internal space of the vacuum separator 2 both the the reversible pump 7 and also flows into the space through the oil shower 5, whereby the flow from this shower 5 is substantially reduced conforming to the reduction of the pressure difference between the external pressure in the cooling loop 1 of the transformer and the pressure in the gas-vapor cushion formed in the vacuum separator 2. As the pressure working cycle represents a dynamic process with a substantial speed of rising of the oil level and of the pressure above this level, a real danger would rise due to return flow of gases and vapors from the gas-vapor cushion to the space of the oil shower 5 or also into the conduit 52 of the oil shower 5. This condition could arise only if the pressure level arises above the height of the external pressure in the cooling loop 1 of the transformer, for instance, in the case of a belated opening of the non-return valve 33.

The occurrence of these conditions can however be prevented by a suitable arrangement of the oil shower 5 at a sufficient distance below the partition wall 23. A quick increase of pressure in the gas-vapor cushion proceeds until there is achieved a pressure level equal to that for opening the return valve 33. By a further increase of pressure non-return valve 33 is opened, and the compressed mixture of gases and vapor starts to flow rapidly into the space of the accumulation extension 3. Immediately thereafter, displacement of the gas-vapor cushion occurs, and also oil starts to flow from the upper space of the vacuum separator 2 to the accumulation extension 3; due to its supply, the height of the level of oil in this space is increased up to the level at which operation of the upper pick-up device 31 is initiated, and the arrangement for vacuum cleaning of oil fillings according to this invention starts again by the earlier described method to operate according to the separating cycle.

From the lowest part of the space of the accumulation extension 3, where a partial condensation takes place with the bubbling of the vapor phase through the relatively cooled oil, the oil with admixtures is taken off by a siphon 14 to the gravity separator 4. At the relatively quiet medium of the gravitation separator 4, an additional separating process takes place due to a different density and the less dense component, i.e. oil is returned by way of the gravity conduit 42 back to the cooling circuit 1 of the transformer. The heavier fractions, in the given case water, are drained from the space of the gravity separator 4 by means of the draining valve 40 and are forwarded to discharge means (not shown) therefor.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. An apparatus for the vacuum cleaning of oil fillings comprising a vacuum separator alternately operating in a separating cycle and a compression cycle, a reversible pump, a piping system connecting the reversible pump to the vacuum separator by which, in the separating cycle, clean oil is sucked off from the separator, and in the compression cycle, contaminated oil is delivered into said vacuum separator, means for producing a vacuum in the separator in the separating cycle by the downward oil level movement therein, means for producing a slight super-atmospheric pressure in the vacuum separator in the compression cycle by the upward oil level movement therein, an accumulation extension vessel, further piping connecting the pump to the accumulation extension vessel for receiving the separated contaminants ejected by the pump from the separator, a discharge conduit connected to the accumulation extension vessel, a gravity separator connected to the discharge conduit to receive oil and water from separation from each other, and control means including a flip-flop circuit for controlling the operation of the reversible pump and consequently the operation of the entire apparatus during its separating cycle and its compression cycle.

2. An apparatus as claimed in claim 1, wherein the vacuum separator is provided in its top portion with a non-return valve through which, in the end phase of the compression cycle, the contaminating admixtures are let off, and which is kept air-tight during the complete separating cycle, the vacuum separator further comprising below said non-return valve an oil shower through which, in the separating cycle and in a part of the compression cycle, contaminated oil is supplied to the vacuum separator, said oil shower communicating with an oil shower piping comprising filter means for removing mechanical contaminants from oil, and throttle means for reducing the contaminated oil feed into the vacuum separator, said piping extending from a bifurcation of a piping connected to the upper portion of a cooling loop of an electric transformer, an overfall from the accumulation cap and a gravity conduit from the gravity separator simultaneously opening into said bifurcation.

3. An apparatus as claimed in claim 2, wherein the vacuum separator in its lowermost portion communicates through a connecting piping with one intake of the reverse pump while the second intake of said pump is connected via feed piping to the lower portion of said cooling loop of the electric transformer in such way that the cleaned oil is sucked off the vacuum separator and pressed into said lower part of the cooling loop while in the compression cycle, oil is sucked off the cooling loop by the reverse pump and driven into the vacuum separator.

4. An apparatus as claimed in claim 1, wherein the top portion of the vacuum separator is connected, through a partition with the one-return valve, to the accumulation cap which in its lower part communicates through a siphon with the gravity separator, and through the overfall in its upper part with the ambient atmosphere so as to cause gaseous contaminants and water vapors to escape into the ambient atmosphere while the oil pressed out by the one-return valve is withdrawn through the siphon into the gravity separator.

5. An apparatus as claimed in claim 1, wherein the gravity separator connected through the siphon wit the accumulation extension is further connected through the gravity conduit having throttle means, with the pipeline bifurcation so that the oil supplied from the accumulation cap and contaminated by water vapor condensate is subjected in the interior of the gravity separator to the separation process based upon the differential oil and water density, a lighter oil fraction with water traces being withdrawn from the gravity separator through the gravity conduit and the oil shower piping into the vacuum separator while a heavier aqueous fraction being let off the lower part of the gravity separator through a deaerating valve.

6. An apparatus as claimed in claim 1, wherein the flip-flop circuit is connected, via lower signal line, with a lower oil level pick-up arranged in the lower part of the vacuum separator, as well as, via upper signal line, with an upper oil level pick-up arranged in the upper part of the accumulation extension, a control line connected to the electric intake of the reverse pump, an oil level drop to below the response level of the lower pick-up in the vacuum separator, to drive oil into the interior of the vacuum separator and, on the contrary, on an oil level rise in the accumulation cap to above the response level of the upper pick-up, to suck oil off the interior of the vacuum separator.

* * * * *